Feb. 13, 1923.

J. G. G. EKLUNDH ET AL

PULSATOR FOR MILKING MACHINES

Filed July 3, 1916     3 sheets-sheet 1

1,444,906

Patented Feb. 13, 1923.

1,444,906

UNITED STATES PATENT OFFICE.

JOHN G. G. EKLUNDH, OF COLUMBUS, OHIO, AND CHARLES O. KENNEDY, OF SERVIA, INDIANA, ASSIGNORS TO THE UNIVERSAL MILKING MACHINE COMPANY, A CORPORATION OF OHIO.

PULSATOR FOR MILKING MACHINES.

Application filed July 3, 1916. Serial No. 107,457.

*To all whom it may concern:*

Be it known that we, JOHN G. G. EKLUNDH, a subject of the King of Sweden, and CHARLES O. KENNEDY, a citizen of the United States, residing at Columbus, in the county of Franklin and State of Ohio, and Servia, county of Wabash, State of Indiana, respectively, have invented certain new and useful Improvements in Pulsators for Milking Machines, of which the following is a specification.

Our invention relates to milking apparatus and more particularly to a pulsator or interrupter for use with teat cups of the inflation or pulsation type which are caused to pulsate or expand and contract by intermittent variation of air pressure.

The object of the invention is to simplify the structure as well as the means and mode of operation of such devices whereby they will not only be cheapened in construction, but will be more efficient in use, automatic in operation, economical in manufacture, and unlikely to get out of repair.

A further object of the invention is to provide a pulsator which will operate automatically under the influence of the suction or vacuum means and to provide an improved form of slide or shifting valve therefor with locking means to prevent the operation of the valve until the pulsator piston has reached the limit of its stroke.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figs. 12 to 15 illustrate modifications of the construction shown in Figs. 1 to 14.

Like parts are indicated by similar characters of reference throughout the several views.

Referring to the drawings, 1 is the air or vacuum pipe line leading to the pump, not shown in the drawing; 2 is the pail or receptacle in which the milk is to be received and 3 represents a set of teat cups of the pulsating or inflation type.

Teat cups of this type are common in the art and inasmuch as they form no part of the present invention will not be here described in detail. It will be sufficient to say that as usually constructed such teat cups are provided with an interior flexible sleeve or diaphragm dividing the teat cup into a teat receiving chamber upon which a constant vacuum is maintained and a pulsating or inflation chamber in which the air pressure is intermittently varied.

Each teat cup 3 is connected by a milk tube 4 leading from the teat chamber to the claw 5 and then through the milk conduit 6 to the pail 2 and is also connected by an air tube 7 leading from the pulsating or inflation chamber of the teat cup to the claw and thence through the air conduit 8 to the pulsator or interrupter by which the vacuum of the pulsating or inflation chamber of the teat cup is intermittently relieved.

Figures 1, 2, 3:
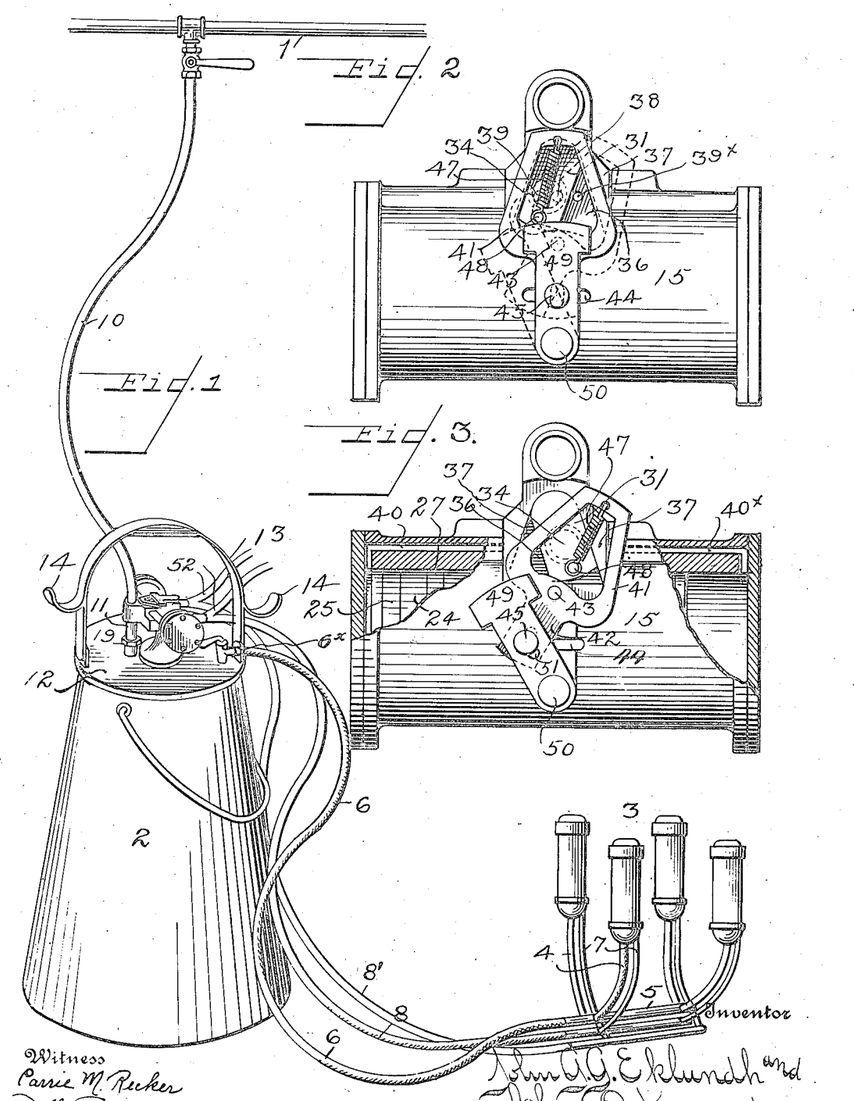
Fig. 1 is a perspective view of the assembled milking apparatus embodying the pulsator forming the subject matter thereof.
Fig. 2 is a top plan view of the assembled pulsator with the piston and valve controlled parts in mid-stroke position.
Fig. 3 is a similar view partly broken away with the piston at the left limit of its stroke.
Figure 4:
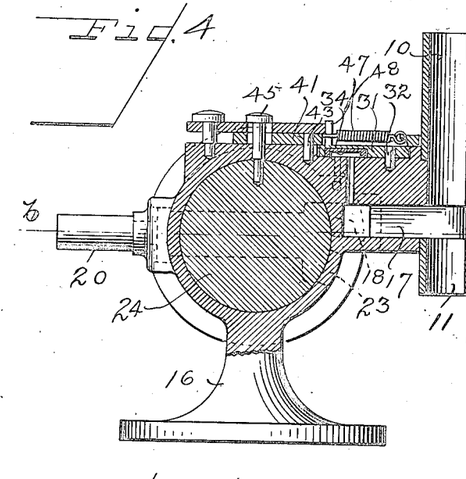
Fig. 4 is a transverse vertical sectional view on line a—a of Fig. 5.

The pulsator which forms the subject matter hereof is connected by a conduit 10 with the pipe line 1. A continuation 11 of the conduit 10 communicates with the pail 2 and serves to exhaust the air therefrom, maintaining a partial vacuum within the pail. For convenience the pulsator is preferably, though not necessarily, located upon the cover 12 of the pail 2, as shown in Fig. 1. It may, however, be located elsewhere in either permanent or temporary position.

In the drawing, the cover 12 of the pail 2 is provided with a bail or handle 13 having at opposite sides thereof fingers 14 upon which the claw 5 and attached teat cups may be suspended when not in use. The milk conduit 6 leading from the claw 5 communicates with the interior of the pail 2 through a faucet or cut off valve 6 located upon the cover 12.

While the pulsator shown in the drawing is of the duplex type, i. e., adapted to simultaneously control two sets of teat cups thus enabling two cows to be milked simultaneously into the same pail, it will be understood that it may be limited to a single set or cluster of teat cups or may be extended to accommodate any desired multiple thereof.

As illustrated in the drawing, the pulsator or interrupter comprises a cylinder 15 having imperforate closure heads mounted upon a suitable standard or base 16. At one side of the cylinder is formed a lateral extension in which is located a manifold or auxiliary chamber 17 communicating with the interior of the cylinder 15 through suction ports 18 and $18^x$. Communicating with the manifold or auxiliary chamber 17 is the suction conduit 10 leading therefrom to the pipe line 1 and also the suction conduit extension 11 which communicates with the pail 2 through the cover 12 thereof. In this extension 11 there is provided a check valve 19, Fig. 1. Communicating with the cylinder 15 preferably, though not necessarily, diametrically opposite the manifold or auxiliary chamber 17 are two conduits 20 and $20^x$ each connected with a separate or independent cluster of teat cups by means of separate air conduits 8. Each of these conduits 20 and $20^x$ have been shown in the drawings as provided with spaced ports 21 and 22 and $21^x$ and $22^x$, respectively, although it is obvious that a single enlarged port for each conduit may be employed in lieu of the spaced double ports. There is also provided in the cylinder wall 15 adjacent to the suction ports 18 and $18^x$ two air inlet ports 23 and $23^x$ open to atmosphere. These atmospheric ports 23 and $23^x$ are offset in relation with the suction ports 18 and $18^x$.

Within the cylinder 15 there is mounted a reciprocatory piston 24 provided with suitable peripheral packing devices to hermetically seal the sliding joint between the piston and the cylinder. In the drawing there has been shown adjacent to each end of the cylinder a cup shaped packing gland 25 held in position by a supplemental head or clamping plate 26. These cupped packing glands 25 are preferably formed of leather, composition, or some similar material. There has also been shown adjacent to the packing cups 25 packing rings 27 of leather, composition, or other packing material located in suitable peripheral grooves in the piston 24 and pressed into contact with the walls of the cylinder 15 by the expansion rings 28 also located within said grooves and surrounded by the rings of packing material. It is to be noted that the piston 24 is devoid of piston rods or other external connection and is free to reciprocate to and fro within the cylinder 15 within the limits prescribed by the cylinder heads.

Figure 5:
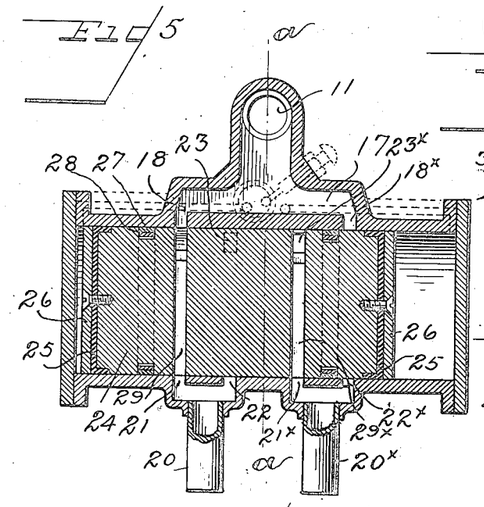
Fig. 5 is a longitudinal horizontal sectional view on line b—b of Fig. 4.
Figure 6:
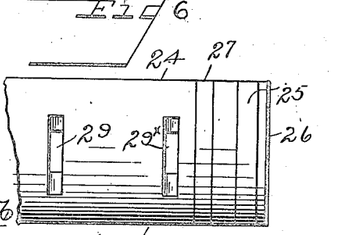
Fig. 6 is a detail side elevation of the piston.
Figure 7:
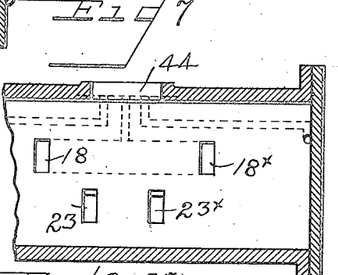
Fig. 7 is a longitudinal vertical sectional view of the cylinder with the piston removed.
Figure 8:
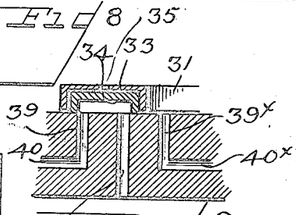
Fig. 8 is an enlarged detail view of the sliding or shifting valve with the ports controlled thereby.

The piston 24 is provided with two transverse ports 29 and $29^x$ so located in relation one with the other that when the piston 24 is at one limit of its stroke the port 29 will connect the suction port 18 with the air conduit port 21 while at the same time the port $29^x$ connects the atmospheric port or air inlet port $23^x$ with the air conduit port $22^x$. This is the position of the piston shown in Fig. 5. At the opposite limit of its stroke the port 29 will connect the atmospheric inlet port 23 with the air conduit port 22 while the piston port $29^x$ will connect the suction port $18^x$ with the air conduit port $21^x$. Thus while one set or cluster of teat cups is connected through the corresponding air conduits 8, the conduit 20, port 21, piston port 29, suction port 18 and manifold to the suction conduit 10 and pipe line 1, thereby exhausting the air from the pulsation or inflation chamber of the teat cup, the inflation chamber of the second set or cluster of teat cups are connected through their corresponding air conduits $8'$, conduits $20^x$, port $22^x$, piston port $29^x$ and through port $23^x$ to atmosphere, thereby admitting air under atmospheric pressure to the pulsation or inflation chamber of the teat cup. Upon the reciprocation of the piston these connections will be reversed and the air will thus be alternately exhausted from and admitted to the inflation or pulsation chambers of the respective clusters of teat cups.

It will be understood that at the same time a continuous suction or vacuum is maintained upon the teat receiving chamber of the teat cup through the milk conduit 6 to the pail 2 and thence through the extension conduit 11 and suction conduit 10 to the pipe line 1. This suction line is independent of the pulsator or interrupter forming the subject matter hereof and is not broken by the operation thereof. The pulsator or interrupter pertains only to the suction line from the inflation or pulsation chamber of the teat cup and serves to alternately connect such inflation or pulsation chamber with the vacuum pump and with atmosphere whereby the flexible sleeve or diaphragm of each teat cup is caused to vibrate.

The movement of the piston 24 to and fro within the cylinder 15 is automatically effected by the exhaustion of the air alternately from one end of the cylinder and the admission of air under atmospheric pressure to the opposite end of the cylinder. To alternate the exhaustion and admission of air to opposite ends of the cylinder 15 there is provided upon the top of the cylinder a suitable valve mechanism comprising a pivoted valve carrier or swinging arm 31 provided with a pivoted stud 32 and having therein a recess or chamber 33 in which is located a floating cap valve or concave disc 34. The concave disc 34 forming the valve fits loosely within the chamber or recess 33. In order that the valve may be perfectly free within the recess or chamber 33 and to prevent it becoming air bound therein, a vent 35 is provided in the upper face of the chamber or recess. The valve carrier 31 oscillates to and fro about its pivotal stud 32 upon a flat surface 36 formed on the upper face of the cylinder body. Its swinging movement in either direction is limited by ledges or flanges 37. Leading from the valve slide surface 36 to the manifold or auxiliary chamber 17 is a port or conduit 38 while adjacent thereto are ports 39 and 39ˣ communicating through conduits 40 and 40ˣ with the opposite ends of the cylinder 15. Thus when the valve carrier 33 is oscillated toward the left as in Fig. 2 the valve 34 simultaneously covers the port 38 and 39, affording intercommunication therebetween. Thus the left hand end of the cylinder is connected through the conduit 40, the port 39, the recess of the valve 34, the port 38 and manifold 17 with the suction conduit 10 while the opposite end of the cylinder is connected through the conduit 40ˣ and port 39ˣ with the atmosphere. Upon a reversal of the valve carrier 31 to the position shown in Fig. 3 the port 38 is connected by the valve with the port 39ˣ, thus exhausting the air from the right hand end of the cylinder 15 through the conduit 40ˣ, port 39ˣ, valve 34 and port 38 to the exhaust conduit 10 and opening the left hand end of the cylinder to atmosphere. Thus as the air is exhausted from one end of the cylinder and the opposite end thereof is opened to atmosphere, the atmospheric pressure upon the piston 24 will reciprocate the piston to alternate the registry of the ports 29 and 29ˣ with the ports 18, 21 and 22 and 23.

Figures 9, 10:
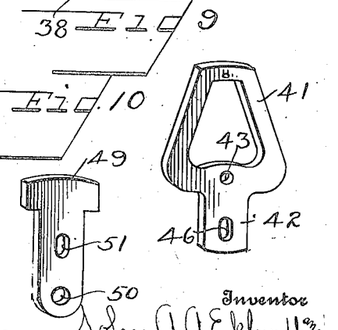
Fig. 9 is a detail perspective view of the valve actuator.
Fig. 10 is a detail perspective view of the valve locking member.
Figure 11:
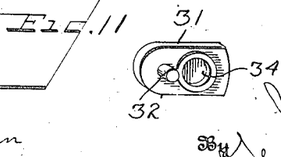
Fig. 11 is a detail perspective view of the valve carrier with the valve seated therein.

To automatically shift the valve carrier 31 to and fro there is provided a pivoted actuator comprising an open lanceolate head 41 and a slotted stem 42 pivoted at 43 to the cylinder body. Projecting through a slot 44 in the cylinder wall 15 is a stud 45 engaging in the slot 46 of the stem 42 of the valve actuator. A helical spring 47 is connected to the apex of the actuator at one end and to a stud or pin 48 projecting from the valve carrier 31 at its opposite end. Thus as the piston is reciprocated to and fro the actuator 41 will be oscillated in unison therewith. As the actuator and piston approach a mid stroke position, the spring 47 will be placed under tension and as these parts continue to move beyond a dead center the reaction of the spring 47 will tend to oscillate the carrier 31 to reverse the valve 34. The valve is thus quickly and suddenly shifted to and fro to reverse the direction of movement of the piston by alternating the exhaustion and admission of air to opposite ends of the cylinder. However, without other means for controlling the operation of the valve it has been found in practice that the valve will operate irregularly, i. e., the tendency is to shift its position before the piston has reached the full limit of its stroke. To prevent this there is provided a locking member shown in detail in Fig. 10 which is pivoted to the cylinder body at 50 and is slotted at 51 to engage over the stud 45 common to this locking member and to the valve actuator 41. Thus as the piston is reciprocated the locking member will be oscillated to and fro in unison therewith and in unison with the valve actuator. However, the actuator and locking member will be moved in opposite directions by the common stud 45. The head of the locking member 49 projects into the path of the stud or pin 48 of the valve carrier until the piston has reached the limit of its stroke. Referring to Fig. 2, the parts are shown in position in which the piston is approaching the left hand end of the cylinder and the locking member is also oscillating toward the left while the actuator 41 is swinging toward the right to place the spring 47 under tension. It will be seen, however, that the valve carrier 31 cannot move toward the right under the influence of the spring 47 until the head of the locking member 49 has been moved beyond the pin 48. There is shown by dotted lines in Fig. 2 the position of the several parts at the moment of release of the valve carrier. Thus the valve is maintained positively locked until the piston has reached the limit of its stroke, whereupon the valve is automatically unlocked or released. The spring 47, at this time being under tension, immediately shifts the valve to its full stroke to reverse the piston. Before the piston has operated to a mid stroke position the locking member 49 will have been again moved into the path of the pin 48, thereby again positively locking the valve until the piston has reached the opposite limit of its stroke whereupon the locking member 49 will pass out of the path of the piston 48, releasing the valve carrier for reversal in the opposite direction. Thus the piston is operated solely by the suction devices and the valve is positively locked and automatically released at predetermined points in the path of movement of the piston.

While a separate unit or cluster of teat cups 3 may be connected to each of the suction conduits 20 and 20× whereby the units will be independently operated alternately, the preferred method of connecting the teat cups is shown in Fig. 1 in which two of the teat cups are connected through the air conduit 8 with the suction conduit 20 and the remaining two of the teat cups are connected through the conduit 8' with the suction conduit 20×. By this arrangement the teat cups of each unit will be alternately operated, i. e., two of the teat cups will be under the influence of the vacuum while the other two will be open to atmosphere, this arrangement being alternated with each stroke of the piston. In the event it is desired to operate two clusters or two units of teat cups simultaneously, they may be connected with the conduits 20 and 20× by Y connections, as at 52, Fig. 1. In such double or duplex construction two teat cups of each unit will be simultaneously brought under the influence of the vacuum while the remaining two teat cups of each unit or cluster will be open to atmosphere. The operation of the teat cups of the respective clusters or units will be alternated with each stroke of the piston. This construction will afford a continuous flow of milk through the milk conduit 6 and will necessitate connections of less capacity. Furthermore, the alternating operation of the teat cups is found more efficient and effective and more closely imitates hand milking operations.

In Figs. 12 to 15 there are shown modifications of the pulsator construction heretofore described which in many respects is the preferred form or embodiment of the invention. In these modifications in lieu of the ports or passages 29 and 29× extending through the piston whereby the piston itself constitutes a valve member, there is provided in the main frame or body a conduit 53 extending around the piston chamber. This conduit 53 communicates at one end with the suction conduit 10 and its extension 11 and extends then downward and beneath the piston chamber and then vertically at the opposite side of the piston chamber where the outlet or orifice is controlled by a slide valve 55. Located adjacent to the orifice 54 of the conduit 53 are orifices 56 and 57 communicating with the conduits 58 and 59 which correspond to the conduits 20 and 20× of the primary construction. The slide valve 55 is adapted by its reciprocatory movement to alternately connect the orifice 54 of the conduit 53 with the orifices 56 and 57 of the respective conduits 58 and 59. There are provided in the slide valve 55 two openings 60 and 61 adapted to alternately register with the orifices 56 and 57. The slide valve is recessed as at 62 to provide an intercommunicating passage between the conduit 53 and the orifices 56 and 57 of the conduits 58 and 59. Thus in Fig. 13 the slide valve 55 is shown in such a position that the conduit 53 is connected through the passage 62 with the orifice 56 of the conduit 58, while at the same time the opening 61 is in registry with the orifice 57 of the conduit 59. At this time the opening 60 being out of registry with the orifice 56 is ineffective.

Figures 12, 13, 14, 15:
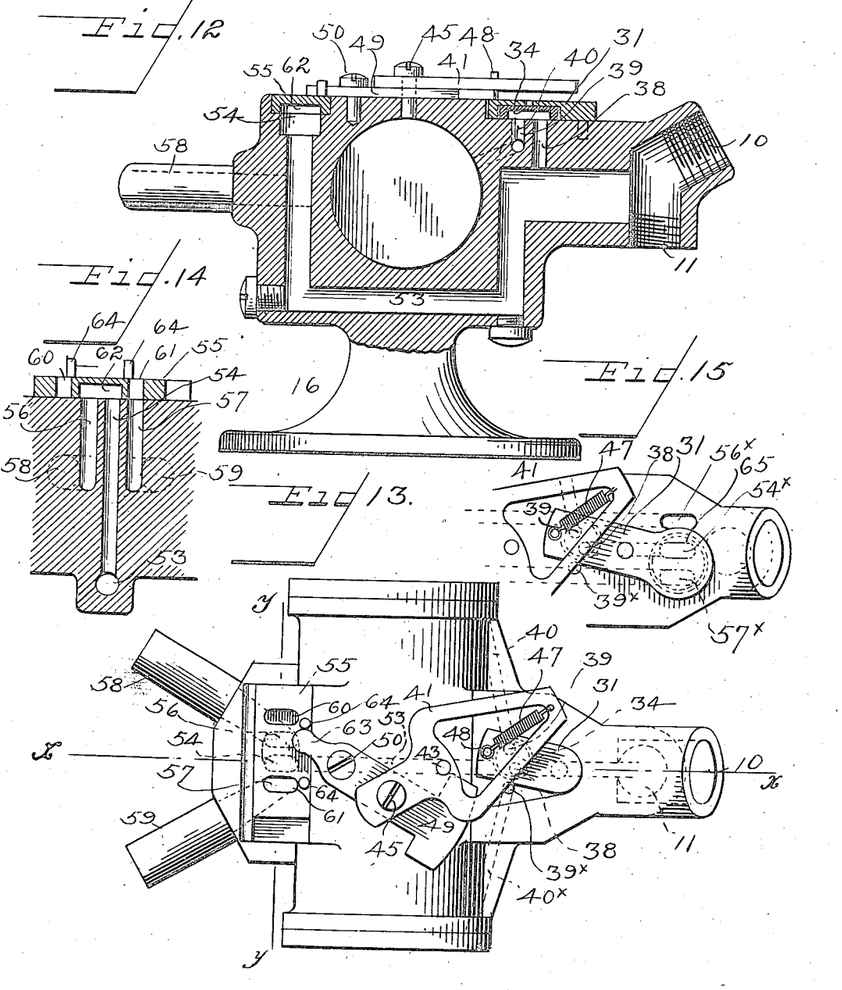
Fig. 12 is a transverse sectional view on line x—x of Fig. 13.
Fig. 13 is a top plan view of the modified construction.
Fig. 14 is a sectional view on line y—y of Fig. 13.
Fig. 15 is a detail top plan view of a further modification of the control valve.

Any suitable means may be employed for shifting the slide valve 55 to and fro as the piston approaches the limit of its stroke in either direction. In Fig. 13 there has been shown a simple connection comprising an extension 63 upon the locking member 49 which is adapted to engage either one of two studs or pins 64 projecting from the slide valve 55. It is to be noted that the extension 63 is permitted a limited movement independent of the slide valve and engages the stud or pin 64 as the locking member 49 approaches the limit of its stroke and thereafter moves the slide valve in unison with the locking member 49 to shift the valve and alternate the connection of the conduit.

In Fig. 15 there is shown a further modification in which the valve carrier 31 is extended beyond its pivotal point and carries a second valve head 65. In this construction the conduits 58 and 59 are extended through the pulsator housing or main frame and beneath the piston chamber in exactly the same manner that 53 is extended in Fig. 14. The orifices of these conduits are indicated at 56× and 57× while the main suction conduit is indicated at 54×. By the construction shown in Fig. 15 the main suction conduit which is in communication with the suction conduit 10 is alternately connected with the conduits 56× and 57× by the oscillation of the valve carrier 31. By this arrangement the valve will be quickly shifted to reverse the connections with the teat cup as the piston approaches the limit of its stroke. The valve will not shift until the valve carrier 31 has been released by the locking member 49 as before described.

From the above description it will be apparent that there is thus provided a device of the character described possessing the particular features of advantage before enumerated as desirable but which obviously is susceptible of modification in its form, proportion, detail construction, or arrangement of parts without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described our invention, we claim:

1. A pulsator mechanism of the class embodying a pulsator valve, fluid pressure operated mechanism for alternating the said valve, a movable control valve governing the action of the fluid pressure upon said operating mechanism, and an actuating spring for the control valve placed under tension by the action of the operating mechanism, characterized by a pivoted locking lever actuated by said operating mechanism the path of travel of which intersects that of the control valve, said locking lever having a contact face substantially concentric with its pivotal point adapted to hold the valve against movement until the locking lever reaches a predetermined point in its path of travel, substantially as specified.

2. A pulsator mechanism of the class embodying a pulsator valve, fluid pressure operated mechanism for alternating the said valve, a movable control valve governing the action of the fluid pressure upon said operating mechanism, and an actuating spring for the control valve placed under tension by the action of the operating mechanism, characterized by two independently pivoted levers having a common operative engagement with the operating mechanism at a point intermediate their pivotal connections whereby said levers are simultaneously oscillated in opposite directions, the said actuating spring for the control valve being connected to one of said levers, the other lever being extended into the path of travel of the control valve and adapted to prevent the reversal thereof until said levers have approached the limit of their paths of travel.

3. In an apparatus of the character described, the combination with a device to be intermittently exhausted and a suction means, of a chamber with which said device and means both communicate, a reciprocatory valve member in said chamber adapted to alternately connect the device with said suction means and with atmosphere, and means to automatically reciprocate the valve member under the influence of atmospheric pressure including a pivoted control valve, a pivoted arm oppositely disposed in overlapping relation with the pivoted control valve, a spring connecting the overlapping portion of the arm and control valve, means for uniformly moving said arm in unison with the reciprocatory movement of the first mentioned valve member to place said spring under tension, and a stop for said control valve also movable in unison with said first mentioned reciprocatory valve member adapted to release the control valve when the first mentioned valve member has reached the limit of its stroke.

4. In an apparatus of the character described, the combination with a device to be intermittently exhausted and a suction means of a chamber with which said device and means both communicate, a reciprocatory piston in said chamber, a transverse port in said piston adapted when the piston is in one position to connect the said member with the suction means and when in a different position to connect said member with atmosphere and means to cause the piston to be automatically reciprocated under influence of atmospheric pressure including two oppositely disposed overlapping movable members, a spring interconnecting the overlapping ends of said movable members, means for moving one of said members in unison with the piston, and locking means for the other member adapted to release said member when the piston has reached the limit of its stroke.

5. In a construction of the character described, a cylinder, a piston therein, a valve adapted to admit actuating media alternately to opposite ends of the cylinder, a pivoted operating arm for actuating the valve by the movement of the piston and a valve locking arm oppositely disposed in overlapping relation with the valve operating arm and connected thereto adapted to release the valve only when the piston has been moved to a predetermined point in its path of travel.

6. In a construction of the character described, a cylinder, a piston therein, a valve adapted to admit actuating media alternately to opposite ends of the cylinder, a pivoted valve operating arm an actuating spring for said valve placed under tension by the movement of the operating arm, and a pivoted locking arm for the valve interconnected with the operating arm adapted to release the valve when the piston reaches a predetermined point in its stroke.

7. In a construction of the character described, a cylinder, a piston therein, a movable valve carrier, actuating means therefor controlled by the piston, and a concave valve member loosely carried by said carrier capable of rotary and vibratory movement therein to and from its seat and shifted in unison therewith, adapted to alternately admit actuating media to opposite ends of the cylinder.

8. In a construction of the character described, a cylinder, a piston, a movable valve carrier having a recess or cavity therein, actuating means therefor and a valve member capable of rotary movement loosely mounted in said recess or cavity adapted to alternately admit actuating fluid to opposite ends of the cylinder.

9. In a construction of the character described, a cylinder, a piston, an oscillatory valve carrier controlled by the piston, a valve carried thereby adapted to alternately admit actuating fluid to opposite ends of the cylinder, an oscillatory stop member also controlled by the movement of the piston, the valve carrier and stop member moving in opposite directions in intersecting paths whereby the valve is held against movement until the stop member is withdrawn from its path by the action of the piston.

10. The combination with fluid pressure operated pulsator mechanism and a control valve governing the action of the fluid pressure upon said mechanism, of a movable carrier for the valve, an oscillatory actuator having a spring connection with the valve carrier, and a locking member moving in unison with the actuator but in reverse direction into and out of the path of travel of the valve carrier to lock said valve carrier against movement until the locking member reaches the limit of its movement, and actuated by said actuator into and out of the path of travel of the valve carrier.

11. The combination with fluid pressure operated pulsator mechanism and a control valve governing the action of the fluid pressure upon said mechanism, of a movable carrier for said valve, an oscillatory actuator therefor, and an actuating spring placed under tension by the movement of the actuator, and an oscillatory stop member having interpivoted engagement with the actuator and a concentric stop face preventing the movement of the valve carrier until the locking member reaches a predetermined point in its path of travel.

12. The combination with fluid pressure operated pulsator mechanism and a control valve governing the action of the fluid pressure upon said mechanism, of a movable carrier for said valve, a movable actuator therefor, an actuating spring placed under tension by the movement of the actuator, and a movable stop member operatively connected with the actuator for unison movement in the opposite direction and preventing the movement of the valve carrier while the locking member continues to move and adapted to permit the movement of the carrier only at the opposite limits of its movement.

13. The combination with fluid pressure operated pulsator mechanism and a control valve governing the action of the fluid pressure upon said mechanism, of a movable carrier for said valve, a movable locking member therefor and a pivoted actuator one end of which is operatively engaged with the valve carrier and the other end of which is operatively engaged with said locking member.

14. The combination with fluid pressure operated pulsator mechanism and a control valve governing the action of the fluid pressure upon said mechanism, of a movable carrier for said valve, a movable locking member therefor, said valve carrier and locking member normally tending to move simultaneously in opposite directions in intersecting paths of travel, and actuating means for both the valve carrier and the locking member by which the valve carrier is conditioned for movement during the movement of the locking member out of locking position.

15. The combination with a fluid pressure operated pulsator mechanism including a reciprocatory piston, a pulsator valve, and a control valve governing the action of the fluid pressure upon said piston, of a pivoted carrier for said control valve, a contact member moving to and fro in unison with the movement of the piston with which the free end of the carrier contacts during the piston stroke, means operatively engaged by the contact member as it approaches the limit of its stroke to shift the pulsator valve, and a spring tensioned by the movement of the piston adapted to swing said valve carrier to a reverse position when said contact member has been moved beyond the point of contact of said free end.

16. The combination with a fluid pressure operated pulsator mechanism including a reciprocatory piston, a pulsator valve, and a control valve governing the action of the fluid pressure upon said piston, of a pivoted carrier for said control valve capable of an oscillatory movement to and fro about its pivotal connection, and a contact member common to both valves traveling to and fro in unison with the piston in a path of travel intersecting the paths of travel of said pivoted carrier and an actuating spring for the valve carrier and the pulsator valve tensioned by the movement of the piston to actuate said valve carrier as said contact member moves beyond its path of travel, the movement of the contact member necessary to release the valve carrier serving to simultaneously shift the pulsator valve, substantially as specified.

17. The combination with a reciprocatory fluid pressure operated piston, a control valve governing the action of the fluid pressure upon said piston, an actuating spring tensioned by the movement of the piston to shift said valve, and a stop means movable in unison with the piston preventing the reversal of the valve under the influence of the spring until the piston approaches the limit of its stroke, of a sliding pulsator valve, a seat therefor upon which the valve is held by preponderance of air pressure, the sliding pulsator valve being intermittently engageable with the piston as the piston approaches the limit of its stroke in either direction to automatically shift said valve, said valve being independent of the piston and remaining at rest during the intermediate portion of the piston stroke.

18. In a milking apparatus, the combination with suction means, a plurality of teat cups, and two independent air conduits communicating with different teat cups of said plurality, of pulsator mechanism adapted to alternately connect one of the air conduits with the suction means and open the other to atmosphere, including a reciprocatory piston, a valve member movable in a path of travel substantially parallel with the path of travel of the piston, a seat for said valve having therein two spaced ports, each communicating with one of said air conduits and a port located intermediate said air conduit ports and communicating with the suction means, an arm moving in unison with the piston and operatively engaging said valve only as the piston approaches the limit of its stroke in either direction to shift the valve to alternately connect one of the air conduit ports with the suction port and open the other air conduit port to atmosphere.

19. In a milking apparatus, the combination with suction means, a plurality of teat cups, and two independent air conduits communicating with different teat cups of said plurality of pulsator mechanism adapted to alternately connect one of the air conduits with the suction means and open the other to atmosphere, including a reciprocatory piston, a valve seat having ports therein, each communicating with one of the air conduits, and having a port communicating with the suctions means, a valve member loosely resting upon said seat upon which it is held by preponderance of air pressure when said suction means is in operation, and an actuating arm moving in unison with the piston adapted to intermittently shift said valve on said seat to alternately connect one of said air conduit ports with the suction port and open the other air conduit port to atmosphere.

20. In a milking apparatus, a fluid pressure operated pulsator mechanism including a main frame, a reciprocatory piston, a valve table upon said main frame extending on opposite sides of the central line of said piston travel at a substantially medial point, a control valve governing the action of fluid pressure upon said piston located on said table at one side of the central line of travel of the piston, a pulsator valve located on said table at the opposite side of the central line of travel of the piston, an actuating spring for the control valve tensioned by the movement of the piston, means moving in unison with the piston for retarding the movement of the valve under the influence of the spring until the piston approaches the limit of its path of travel in either direction, and means moving in unison with the piston operatively engaging the pulsator valve as the piston approaches the limit of its stroke in either direction to intermittently shift said pulsator valve.

21. The combination with a fluid pressure operated pulsator mechanism, including a reciprocatory piston, a pulsator valve, and a control valve governing the action of the fluid pressure upon said piston, of tumbler mechanism for the control valve including two independently pivoted oscillatory levers arranged in overlapping relation, each independently movable to and fro across a dead center position in relation with their pivotal points, a spring connecting the free ends of said levers, and means to oscillate one of the levers to tension the spring, the reaction of which actuates the second lever to reverse said control valve.

22. The combination with a fluid pressure operated pulsator mechanism including a reciprocatory piston, a pulsator valve, and a control valve governing the action of the fluid pressure upon said piston, of tumbler mechanism for the control valve mechanism, two independently pivoted levers extending in opposite directions from their pivotal points and movable to and fro across a dead center position in relation with their pivotal centers, a spring connecting the free ends of the levers and means to move one lever to tension said spring, the reaction of which will actuate the other lever to alternate the application of the fluid pressure.

23. The combination with a fluid pressure operated pulsator mechanism, including a reciprocatory piston, a pulsator valve, and a control valve governing the action of the fluid pressure upon said piston, of tumbler mechanism for the control valve including a pivoted valve lever, a helical tension spring attached to the free end of the valve lever, and extending thence toward its pivotal center, and a movable connection for the spring movable to and fro past the pivotal center of said lever whereby the spring exerts its reaction alternately in opposite directions to intermittently reverse said lever.

24. The combination with a fluid pressure operated pulsator mechanism, including a reciprocatory piston, a pulsator valve, and a control valve governing the action of the fluid pressure upon said piston, of an oscillatory lever actuated by the reciprocation of the piston and having operative engagement with the pulsator valve and normally preventing the operation of the control valve until the piston approaches the limit of its movement.

25. The combination with a fluid pressure operated pulsator mechanism, including a reciprocatory piston, a pulsator valve and a spring actuated control valve governing the action of the fluid pressure upon said piston and normally held against movement, of a member moving in unison with the piston and common to both the pulsator and control valves, adapted to shift the pulsator valve and release the control valve for movement under the influence of its spring as the piston approaches the limit of its movement in either direction.

26. The combination with a fluid pressure operated pulsator mechanism including a reciprocatory piston, a pulsator valve, and a movable control valve governing the action of the fluid pressure upon the piston, of a pivoted lever oscillated to and fro by the movement of the piston, one arm of the lever having operative engagement with the pulsator valve and the other arm serving to prevent movement of the control valve until the piston approaches the limit of its stroke in either direction.

In testimony whereof, we have hereunto set our hands this 22 day and 19 day of June A. D. 1916, respectively.

JOHN G. G. EKLUNDH.
CHARLES O. KENNEDY.

Witnesses to signature of Eklundh:
H. J. OSSING,
J. B. MILLER.

Witnesses to signature of Kennedy:
CARRIE M. RECKER,
EDW. E. DUNCAN.